United States Patent [19]

Sorkin et al.

[11] 4,001,687
[45] Jan. 4, 1977

[54] ANGULAR VELOCITY INDICATING APPARATUS

[75] Inventors: Morris Sorkin, Santa Monica; Jeffrey A. Oicles, Redondo Beach, both of Calif.

[73] Assignee: TRW Inc., Redondo Beach, Calif.

[22] Filed: Mar. 10, 1975

[21] Appl. No.: 556,591

Related U.S. Application Data

[63] Continuation of Ser. No. 422,224, Dec. 6, 1973, abandoned.

[52] U.S. Cl. .............................................. 324/173
[51] Int. Cl.² .......................................... G01P 3/48
[58] Field of Search ........................... 324/173, 174

[56] References Cited

UNITED STATES PATENTS

| | | | |
|---|---|---|---|
| 2,913,662 | 11/1959 | Hogan | 324/174 X |
| 3,043,140 | 7/1962 | Waugh et al. | 324/173 X |
| 3,177,711 | 4/1965 | Ham et al. | 324/173 X |
| 3,433,070 | 3/1969 | Grimaldi | 324/173 X |
| 3,559,064 | 1/1971 | Grundy | 324/173 |

FOREIGN PATENTS OR APPLICATIONS

| | | | |
|---|---|---|---|
| 746,191 | 3/1956 | United Kingdom | 324/173 |

OTHER PUBLICATIONS

Walewski, L. G., Kendrick V. C., Position Detection Device Using Amplitude Modulation, IBM Technical Disclosure Bulletin, vol. 14, No. 7, Dec. 1971, pp. 2119-2120.

Primary Examiner—John K. Corbin
Assistant Examiner—Rolf Hille
Attorney, Agent, or Firm—S. J. Koundakjian; Edwin A. Oser

[57] ABSTRACT

Disclosed is an apparatus for generating a pulse train whose instantaneous repetition rate represents the instantaneous angular velocity of a rotating device.

An oscillator feeds a high frequency signal to a coil through which a center pole of magnetic material projects. The rotating device causes an object such as a gear to rotate, at least a portion of the extremity of which (e.g., the tips of its teeth, in the case of a gear) repeatedly comes into close contact with the tip of the center pole, separated only by a small air gap. This results in a change in inductance of the coil, which amplitude modulates the oscillator output. The modulated output is passed through a peak voltage detector which generates the desired pulse train.

8 Claims, 5 Drawing Figures

ANGULAR VELOCITY INDICATING APPARATUS

This is a continuation of application Ser. No. 422,224, filed Dec. 6, 1973, now abandoned.

BACKGROUND OF INVENTION

1. Field of Invention

This invention relates to apparatus for the measurement of angular velocity of rotating devices and has application in the area of digital speedometers and the like.

2. Description of Prior Art

The function of the present invention is to produce a pulse train whose instantaneous repetition rate represents the instantaneous angular velocity of a rotating device. This pulse train may be directed into appropriate electronic circuitry for digital readout of, for example, the rate of revolution of the device or the linear speed of a vehicle in which the rotating device comprises or is coupled to a portion of the drive train.

The magnetic pulser is perhaps the most closely related prior art device. Here, a steel gear-like rotor is coupled to a rotating shaft. A permanent magnet is aligned so that the tips of the "gear" teeth successively come into close proximity to the tip of the magnet while the device rotates. The permanent magnet is surrounded by a coil. The magnetic flux is at a maximum when the magnet and a tooth are in line and decreases to a minimum when they are out-of-line. This causes a voltage to be generated in the coil due to the rate of change of magnetic flux. A voltage pulse is, therefore, generated as each tooth passes the magnet, the ultimate pulse repetition rate being proportional to the angular velocity of the rotor and, therefore, of the shaft.

The induced voltage in the coil is proportional to the rate of change of magnetic flux. Therefore, at very low rotation speeds, pulses of very low amplitude are generated. However, flip-flops and similar digital electronic circuit elements must be operated above their threshold voltages. Therefore, if an ordinary magnetic pulser is coupled with a digital readout circuit, erratic results will be obtained when the angular velocity of the shaft is below a certain level.

SUMMARY OF THE INVENTION

Accordingly, it is the object of this invention to provide a magnetic rotational velocity sensor in which the ultimate output pulse amplitude is substantially independent of the rotation speed being sensed.

Briefly, in the present invention, the magnetic pickup does not incorporate a permanent magnet. Rather, it comprises a coil surrounding a center pole which is of magnetic material. An oscillator generates a signal which passes through an RLC circuit of which the magnetic pickup coil comprises an inductance element. The inductance of this element, and thus the impedance of the resonant circuit, changes with the changes in alignment between the center pole and the "teeth" of a gear-like rotor (or magnetic extremity of some other rotating device such as a small wheel) rotating synchronously with the rotating device ultimately being monitored. Thus, as the rotor rotates, the circuit amplitude modulates the oscillator output.

The amplitude modulated output is passed through a peak voltage detector which converts the signal into a train of pulses whose instantaneous repetition rate represents the instantaneous angular velocity of the rotor and, therefore, of the ultimate device.

DETAILED DESCRIPTION OF THE PREFERRED EMBODIMENT

Figure 1:
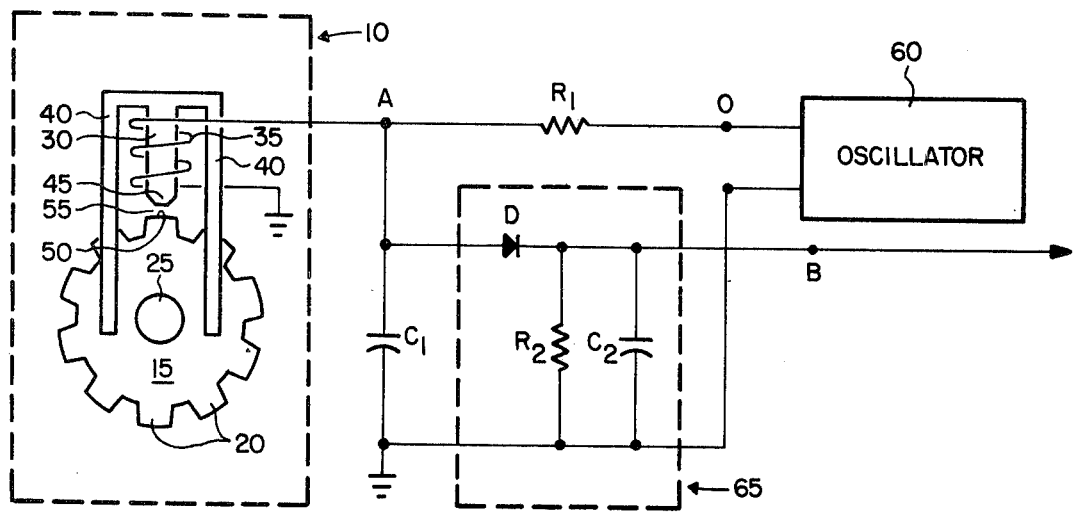
FIG. 1 is a schematic representation of the pulse generating circuit of the present invention.

Referring now to FIG. 1 of the drawing, the preferred embodiment of the present invention incorporates a magnetic pickup 10, which comprises in essence, a rotor 15, a center pole 30 and a coil 35 surrounding the latter. The rotor is operably connected to the shaft 25 (e.g., an automobile drive shaft) whose angular velocity is to be measured. This connection may be achieved by coaxial rigid mounting, as shown in the drawing, by gearing or by any other suitable means by which the rotor may be caused to rotate synchronously with rotation of the shaft, with their angular velocities equal or, at least, in fixed relationship.

Figure 2:
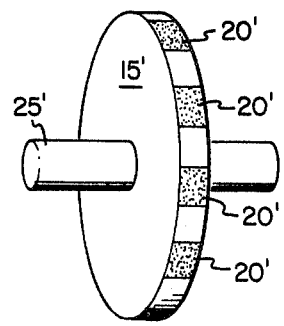
FIG. 2 is a perspective view of an alternative embodiment of the rotor shown in FIG. 1.

In any event, the rotor 15 incorporates one or more peripheral teeth 20; preferably there are several, regularly spaced about the rotor periphery. The rotor teeth and the body of the rotor are, in the preferred embodiment, fabricated from a magnetic material, for example, Permalloy. In other embodiments, the body of the rotor might be non-magnetic, while the teeth or tips thereof are magnetic. Likewise, as shown in FIG. 2, the rotor may simply comprise a non-magnetic, small wheel, portions of whose periphery are magnetic or coated with a magnetic material (e.g., $Fe_2O_3$).

The center pole 30 is fabricated from a magnetic material, such as Permalloy, and is aligned radially with respect to the axis and plane of rotation of the rotor 15. The center pole is spaced from the gear so that when a rotor tooth (or magnetic peripheral region of the rotor wheel) is in alignment with the center pole, a small gap 55 exists between the tip 45 of the center pole and the tip 50 of the gear tooth (or magnetic region).

The gap width will be determined principally by the nature of the rotor. If a gear-like rotor is employed with magnetic teeth, the gap may be greater than in the case where a rotor wheel with peripheral magnetic regions is utilized. Generally, it should not be less than about 0.01 inch in width to avoid problems which might otherwise result from imperfection in manufacturing or the collection of dust, oil or the like within the air gap due to poor environmental sealing of the pickup 10, which might close the gap or, at least, alter the inductance of the coil 35.

In embodiments where a wholly-magnetic gear-like rotor 15 is employed, there are, integral with, or otherwise magnetically coupled with the material comprising the center pole 30, a plurality of outer poles or overhanging "arms" 40, of magnetic material which, as shown in the drawing, project over the rotor 15. These are in closely spaced relationship to the face thereof, and any number of them may be employed. Preferably they are caused to project along both of the substantially circular faces, a short distance (perhaps 0.01 inch) therefrom. For example, with reference to the drawing, two arms might project along one face of the rotor, while two others (not shown, but behind the two shown) might project along the opposite face. Employment of one or more outer poles on both sides of the gear reduces the problem of their alignment with the gear.

The purpose of these arms 40 is to provide a low reluctance return flux path to the magnetic rotor, 10 which is independent of the number of its teeth and its size. Such a path will maximize the change in inductance between the conditions when the pole piece 30 is aligned with a tooth 20 and the next occurrence of misalignment. Since they create a return flux path independent of the size and number of teeth of the rotor, the arms introduce great flexibility in the implementation of the present invention.

Preferably the tip 45 of the center pole 30 is tapered, as shown in the drawing. This will further contribute to maximizing inductance changes between conditions of gear tooth/pole piece alignment and misalignment. This is particularly important in cases where it is desired to employ a gear with a large number of teeth.

The particular means employed to operably connect the rotor 15 to the shaft 25 (or other device) whose angular velocity is to be measured — whether by use of rigid coaxial mounting, gears, belts, or other method — is conventional and depends primarily on the nature of the shaft or other device, and, consequently, on the conditions under which the pickup must operate. Similarly, the number of teeth 20 will depend on the range of angular velocity to be measured; the greater the typical velocity, the lesser the number of teeth.

In essence, therefore, the magnetic pickup 10 comprises a variable inductor whose instantaneous inductance is a function of the instantaneous mutual alignment of the center pole 30 and the teeth 20 or other peripheral magnetic regions. The inductance is at a maximum in a condition of alignment and at a minimum when the tip 45 of the center pole is precisely between two teeth (or regions).

The pickup 10 is the inductor in an RLC circuit coupled to the output of an oscillator 60, which, for the sake of illustration, will be assumed to generate a uniform-amplitude sinusoid with a frequency of 10 KHz. The resistance R1 and the capacitance C1 of the RLC circuit are adjusted, together with the dimensions of the pickup so that the circuit is tuned to the output frequency of the oscillator when the inductance of the pickup is at a maximum. Selecting a value of 3600 ohm for the resistor R1 and the value of the capacitance C1 as 0.25 $\mu$F, the circuit will resonate at 10 kHz when the pickup 10 is in a state of alignment, at which time the inductance is about 1 mH. In such a state, the impedance of the coil in parallel with the capacitor C1 is about 3600ohms, resulting in a voltage at point A at approximately one-half the voltage of the 10 kHz oscillator output.

Thus, with these parametric values, if the oscillator generates a 10 kHz alterating current at approximately 10 volts peak, the maximum voltage at point A (again, when a rotor tooth 20 is in alignment with the tip 45 of the center pole 30) will be approximately 5 volts peak. When the rotor has revolved slightly so that the tip is halfway between two teeth, the coil inductance drops to about 0.1 mH and the impedance of the coil/capacitor C1 combination drops to about 360 ohms. The voltage at point A then becomes approximately 0.5 volts peak.

Therefore, as the rotor 15 revolves, the signal at point A consists of a 10 kHz oscillation amplitude modulated by a signal whose frequency is the rate of rotation of the rotor 15, times the number of teeth 20 on the rotor.

A conventional peak voltage detector 64, consisting of a diode D, a resistor R2 and a capacitor C2, converts the modulated 10 kHz signal at point A to a unidirectional pulse train.

The output from the peak voltage detector 65, at point B, will consist of a pulse train with a repetition rate equal to the number of rotor teeth 20 passing the center pole 30 of the magnetic pickup 10 per second.

Figure 3A:
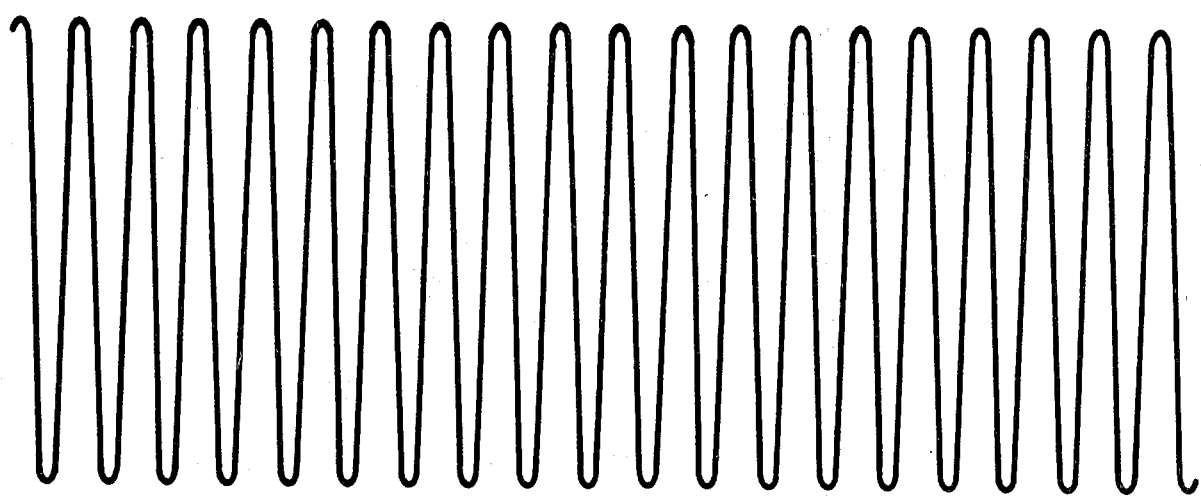
FIG. 3A is a representation of a typical waveform at point 0 in FIG. 1.
Figure 3B:
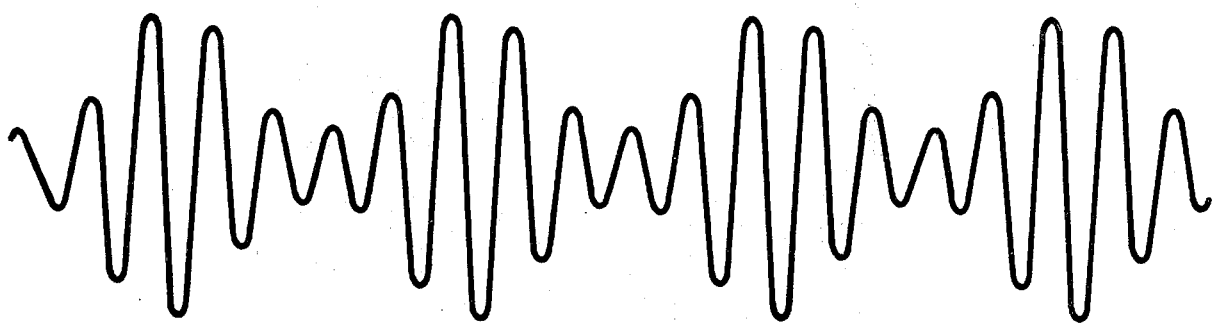
FIG. 3B is a representation of a typical waveform at point B in FIG. 3A.
Figure 3C:
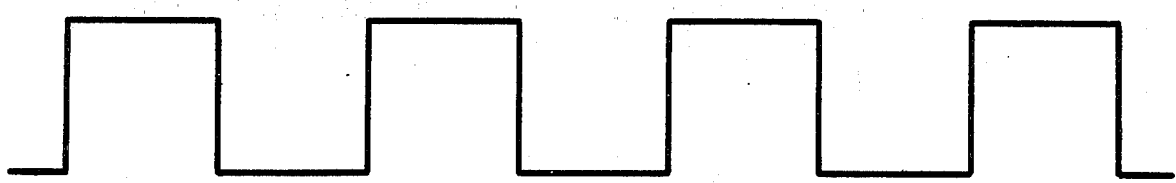
FIG. 3C is a representation of a typical waveform at point C in FIG. 3B.

FIGS. 3A, 3B and 3C illustrate the foregoing by showing typical waveforms at points O, A and B, respectively, in FIG. 1.

While the pulse repetition rate will depend on the angular velocity of the gear 15, the ultimate output voltage of the pulses will be independent of its angular velocity. Rather, it will depend primarily on the output voltage of the oscillator 60, which can be set high enough so that the amplitude of the pulses will be well beyond the threshold of the particular electronic devices utilized. Thus, the present invention, unlike previous devices whose operation is based on the generation of pulses whose amplitude depends on the rate of change of magnetic flux, may be used successfully to monitor even the lowest ranges of angular velocity.

A typical application for the apparatus is as a pulse train generator for use as the input to a digital automobile speedometer. Here, the pickup 10 is positioned on the drive shaft of the automobile between the transmission and the differential. The rotor 15 is typically coaxial with the drive shaft, or connected by means of a gear train, while the remainder of the pickup is positioned relatively as shown in the drawing. To avoid oil, dust or other contamination, the entire pickup is environmentally sealed.

The pulse train output (at point B) from the entire apparatus of the present invention is passed through appropriate electronics for digital readout on the automobile dashboard.

However, the speed of the vehicle is determined, not only by the angular velocity of the drive shaft, but also by the rear axle ratio and the wheel size. The conversion from angular velocity of the shaft to speed of the vehicle can be accomplished within the electronic circuitry which intervenes between the circuitry of the present invention and the digital display. This would simply require inclusion of a digital or analog multiplier whose multiplication factor is fixed (or adjusted), according to the parameters of the particular automobile.

Since, in the preferred embodiment of the present invention, the size and number of teeth of the rotor 15 have, because of the use of the arms 40, no effect on the return flux path, there is a simpler means for accomplishing this result. If the number of teeth are appropriately selected, according to the axle ratio and wheel size, the present apparatus can facilitate a direct readout in miles or kilometers per hour for the particular automobile.

This can be demonstrated quite simply.

The speed of an automobile, in kph (kilometers per hour) is related to the revolution rate of the drive shaft by the following formula:

$$kph = \left(\frac{DSS}{RAR}\right) \times \left(\frac{RTC}{1000}\right) \times 60, \quad (1)$$

$DSS =$ drive shaft speed in revolutions per minute;
$RAR =$ rear axle ratio; and
$RTC =$ rear tire circumference, in meters.

The number of teeth 20 passing the tip 45 of the center pole 30 of the magnetic pickup 10 per second (i.e., the ultimate pulse repetition rate) is found from the following formula:

$$F = \left(\frac{DSS}{60}\right) \times (RGR) \times (N), \quad (2)$$

where:

$F =$ number of teeth per second (i.e., the pulse repetition rate, in pulses per second);
$DSS =$ drive shaft revolution rate, in rpm.
$RGR =$ gear ratio between the drive shat and the rotor 15 (i.e., the ratio of rotor revolution rate to drive shaft revolution rate); and
$N =$ number of rotor teeth 20.

To provide an apparatus in which the pulse rate $F$ equals the automobile speed (i.e., to provide a direct speedometer readout), we equate $F$, in equation (2), with kph, in equation (1):

$$\left(\frac{DSS}{RAR}\right) \times \left(\frac{RTC}{1000}\right) \times 60 = \left(\frac{DSS}{60}\right) \times (RGR) \times (N); \text{ or} \quad (3)$$

$$\left(\frac{RTC}{RAR}\right) \times 3.6 = (RGR) \times (N); \text{ or} \quad (4)$$

$$\frac{(RGR) \times (N) \times (RAR)}{RTC} = 3.6 \quad (5)$$

It can easily be seen from formula (5) that the pulse repetition rate equals the automobile speed in kph in any of an enormous number of circumstances, including the following:

| ROTOR GEAR RATIO (RGR) | 1/10 | 1/10 | 1/6 | 1/8 |
|---|---|---|---|---|
| NUMBER OF TEETH (N) | 24 | 18 | 18 | 18 |
| REAR AXLE RATIO (RAR) | 3 | 4 | 3 | 4 |
| REAR TIRE CIRCUMFERENCE (RTC) | 2 | 2 | 2.5 | 2.5 |

With the automobile speed thus equated to the pulse repetition rate, an automobile speedometer may be constructed merely by directing the output from the apparatus of the present invention to a conventional pulse counter with, preferably, a digital readout. Thus, by merely changing the number of teeth 20 on the rotor 15 and/or the gear ratio between the rotor and the automobile drive shaft, a digital speedometer, otherwise of uniform design, may be utilized in virtually all automobiles, by incorporation of the apparatus of the present invention.

Thus, if each rotor properly selected for each particularly automobile, the remainder of the pickup 15 and associated circuitry, including the digital readout circuitry, may be identical for all automobiles. The economic benefits of such standardization, provided by the design of the present invention, are obvious.

We claim:
1. The apparatus for generating a pulse train whose pulse repetition rate is in fixed relationship to the rotational speed of a rotating element of the drive train of a motor vehicle, comprising, in combination:
A. oscillator means for generating a substantially constant-frequency alternating signal;
B. means for amplitude modulation of the signal from said oscillator means, the instantaneous envelope frequency of the modulation being in fixed relationship to the instantaneous rate of rotation of the element, said modulation means comprising an electrical circuit responsive to the output of said oscillator means, said electrical circuit including:
1. variable inductance means, the rate of change of inductance of said variable inductance means being in fixed relationship to the instantaneous rate of rotation of the element, said variable inductance means comprising:
a. an object coupled to the rotating element of the motor vehicle drive train in such manner as to cause said object to rotate with an instantaneous rate of revolution in fixed relationship with the instantaneous rate of revolution of the element, said object having at least one projection oriented substantially radially with respect to the axis of revolution of said object, at least the extremity of said projection being of magnetic material;
b. an elongated center pole of magnetic material, said center pole oriented substantially radially to the axis of revolution of said object and substantially in the plane of revolution of said object, one end of said center pole being displaced from the axis of revolution of said object a sufficient distance to preclude contact between said projection and said end during rotation of said object; and
c. an electrically conductive coil surrounding said center pole and in electrical communication with the output of said oscillator means; and
2. a capacitor connected with said variable inductance means, the capacitance of said capacitor being selected to tune said electrical circuit to said oscillator frequency when the inductance of said variable inductance means is at a maximum value; and
c. means responsive to the modulated signal and adapted to generate a train of pulses in response thereto, the instantaneous repetition rate of said pulses being in fixed relationship to the modulation frequency.

2. The apparatus, as recited in claim 1, wherein a plurality of said projections is provided on said object.
3. The apparatus, as recited in claim 2, wherein said projections are in substantially equal mutual angular displacement about said object.
4. The apparatus, as recited in claim 2, further including:
means for providing a low reluctance return magnetic flux path between said extremity of said projection and said center pole
5. The apparatus, as recited in claim 4, wherein said return flux means comprises:

an elongated structure of magnetic material in magnetic communication with said center pole, said structure being in close proximity to a portion of said object in magnetic communication with said extremity of said projection.

6. The apparatus for generating a pulse train whose pulse repetition rate is in fixed relationship to the rotational speed of a rotating element of the drive train of a motor vehicle comprising, in combination:
A. oscillator means for generating a substantially constant-frequency alternating signal;
B. means for amplitude modulation of the signal from said oscillator means, the instantaneous envelope frequency of the modulation being in fixed relationship to the instantaneous rate of rotation of the element said modulation means comprising an electrical circuit responsive to the output of said oscillator means, said electrical circuit including:
1. variable inductance means, the rate of change of inductance of said variable inductance means being in fixed relationship to the instantaneous rate of rotation of the element, said variable inductance means comprising:
  a. an object coupled to the rotating element in such manner as to cause said object to rotate with an instantaneous rate of revolution in fixed relationship with the instantaneous rate of revolution of the element, said object having, at its periphery, at least one substantially non-projecting region comprising a magnetic material, said region being discontinuous about said periphery, the remaining portion of said periphery being at least surfaced with non-magnetic material:
  b. an elongated center ple of magnetic material, said center pole oriented substantially radially to the axis of revolution of said object and substantially in the plane of revolution of said object, one end of said center pole being displaced from the axis of revolution of said object a sufficient distance to preclude contact between said region and said end during rotation of said object; and
  c. an electrically conductive coil surrounding said center pole and in electrical communication with the output of said oscillator means; and
2. a capacitor connected with said variable inductance means, the capacitance of said capacitor being selected to tune said electrical circuit to said oscillator frequency when the inductance of said variable inductance means is at a maximum value; and
C. means responsive to the modulated signal and adapted to generate a train of pulses in response thereto, the instantaneous repetition rate of said pulses being in fixed relationship to the modulation frequency.

7. The apparatus, as recited in claim 6, wherein a plurality of said regions is provided on said object.

8. The apparatus, as recited in claim 6, wherein said regions are in substantially equal mutual angular displacement about said object.

* * * * *